United States Patent [19]
Rasson et al.

[11] Patent Number: 6,137,549
[45] Date of Patent: Oct. 24, 2000

[54] PROGRAM GUIDE DATA DISTRIBUTION SYSTEM WITH CONFIGURABLE QUEUES

[75] Inventors: Donald Rasson, deceased, late of Parker, by Sonia Rasson, legal representative; Rose A. Reynolds; Michael D. Ellis, both of Boulder; Robert R. Predolich, Highlands Ranch; Jeffrey A. Ross, Littleton; Joel G. Hassell, Arvada, all of Colo.

[73] Assignee: United Video Properties, Inc., Tulsa, Okla.

[21] Appl. No.: 08/948,756

[22] Filed: Oct. 10, 1997

[51] Int. Cl.[7] .................................................. G06F 13/00
[52] U.S. Cl. ........................... 348/906; 709/235; 711/170
[58] Field of Search ....................... 395/200.65; 348/906; 348/461; 709/235; 711/129, 170, 173

[56] References Cited

U.S. PATENT DOCUMENTS

| | | | |
|---|---|---|---|
| 5,388,097 | 2/1995 | Baugher et al. | 370/455 |
| 5,521,631 | 5/1996 | Budow et al. | 348/7 |
| 5,550,576 | 8/1996 | Klosterman | 348/6 |
| 5,619,274 | 4/1997 | Roop et al. | 348/461 |
| 5,630,119 | 5/1997 | Aristides et al. | 707/1 |
| 5,666,645 | 9/1997 | Thomas et al. | 455/6.1 |
| 5,742,677 | 4/1998 | Pinder et al. | 380/242 |
| 5,760,821 | 6/1998 | Ellis et al. | 348/10 |
| 5,798,785 | 8/1998 | Hendricks et al. | 348/1 |
| 5,801,747 | 9/1998 | Bedard | 348/1 |
| 5,886,690 | 3/1999 | Pond et al. | 345/327 |

FOREIGN PATENT DOCUMENTS

| | | |
|---|---|---|
| 0 463 451 A2 | 1/1992 | European Pat. Off. . |
| 0 758 833 A2 | 2/1997 | European Pat. Off. . |
| WO 96/41471 | 12/1996 | WIPO . |

OTHER PUBLICATIONS

Cherrick et al.; An Individually Addressable TV Receiver With Interactive Channel Guide Display, VCR, and Cable Box Control; IEEE Transactions on Consumer Electronics; pp. 317–328, Aug. 1994.

Hartwig S. et al. "Broadcasting and Processing of Program Guides for Digital TV" SMPTE Journal, vol. 106, No. 10, Oct. 1997, pp. 727–732.

Primary Examiner—Kenneth R. Coulter
Attorney, Agent, or Firm—Fish & Neave; G. Victor Treyz; Joo-Youn Park

[57] ABSTRACT

A system is provided for distributing television program guide data from a main facility to set-top boxes or similar receivers via local television systems. Program guide data is placed in a number of selectively configurable queues. The configuration of the queues is determined by queue configuration data that may be supplied by the operator of the main facility. The operator can readily reconfigure the queues by altering the queue configuration data. Program guide data from the queues may be distributed to the receivers using multiple feed generators, each of which distributes program guide data to receivers with different addresses. The feed generators determine which receivers are busy processing recently transmitted data, so that data may be directed toward receivers that are not currently busy.

42 Claims, 5 Drawing Sheets

PROGRAM GUIDE DATA DISTRIBUTION SYSTEM WITH CONFIGURABLE QUEUES

BACKGROUND OF THE INVENTION

This invention relates to data transmission, and more particularly, to program guide data distribution for interactive television program guides.

Cable, satellite, and broadcast television systems provide viewers with a large number of television channels. Viewers have traditionally consulted printed television program schedules to determine the programs being broadcast at a particular time. More recently, interactive electronic television program guides have been developed that allow television program information to be displayed on a viewer's television.

Interactive program guides are typically implemented on set-top boxes. Such program guides allow users to view television program listings in different display formats. For example, a user may instruct the program guide to display a grid of program listings organized in a channel-ordered or a time-ordered list. Users may also search and sort program listing by theme (e.g., movies, sports, etc.) or by title (i.e., alphabetically). A user may view additional information on a program by placing a highlight region on a desired program listing and pressing an "info" button. The user may purchase a pay program from the program guide by placing the highlight region on a program listing and pressing an "OK" button. Some systems allow the user to select a program for recording by placing the highlight region on a program listing and pressing a "record" button.

Program guide data such as program listings, pay-per-view program purchasing information, promotional information, etc. is provided to users' set-top boxes with a data distribution system. Program guide data is typically stored in a central program guide database. Periodically, selected program guide data from the central database is transmitted to the headend facilities of various cable systems. Each headend distributes the program guide data to the set-top boxes in its system.

It is sometimes difficult to distribute program guide data efficiently. Some program guide data (e.g., for current listings) has a higher priority than other program guide data (e.g., for future listings). Moreover, the set-top boxes to which the data must be provided are typically spread over a large geographic area and different groups of set-top boxes require different sets of program guide data. As a result, the program guide data needed for one area is often different than the program guide data needed for another area. It would be desirable if the data processing tasks for different areas could be handled separately to improve system throughput. Moreover, when new cable systems are added, the bandwidth of the data transmission system may start to become filled. It would be desirable if the program guide data provider were able to reconfigure the data transmission system to accommodate such new systems within the available bandwidth of the data transmission system. Another feature that would be useful for a program guide data distribution system is the ability to ease the processing requirements imposed on the cable systems when distributing the program guide data to the set-top boxes.

It is therefore an object of the present invention to provide an improved arrangement for distributing television program guide data from a centralized program guide database to the set-top boxes or other television equipment on which users have implemented television program guides.

SUMMARY OF THE INVENTION

This and other objects of the invention are accomplished in accordance with the principles of the present invention by providing a system in which program guide data is distributed from a main facility to receivers such as set-top boxes through local systems. The local systems may be cable systems, satellite systems, or broadcast television systems.

A program guide database in the main facility is used to store a comprehensive set of program guide data. A platform-specific processor implemented on the main facility may be used to extract selected portions of the program guide data. Platform-specific data may be added to the extracted portions of program guide data by the platform-specific processor.

The platform-specific processor passes the program guide data to which the platform-specific data has been added to a queue generator. The queue generator may be implemented on the main facility. The operator of the main facility provides the queue generator with queue configuration data. The queue generator forms multiple master queues for the program guide data based on the queue configuration data supplied by the operator. The operator may supply the queue configuration data using any convenient input interface (e.g., a mouse, a keyboard, a diskette containing predefined queue configuration data, etc.). The operator can reconfigure the data transmission system whenever a new local system is added to accommodate such new local systems within the existing bandwidth of the data transmission system.

The master queues contain ordered lists, each of which contains references to data records containing the program guide data. The queue generator preferably attaches version number information to the data records.

The queue generator generally provides the program guide data for the master queues to multiple feed generators, which may be implemented, for example, on an uplink facility or in the main facility. Each feed generator has an associated list of receiver addresses to which it may distribute data. Preferably, each feed generator handles the data distribution tasks for a substantially different set of receivers and associated program guide data. For example, because different countries typically have substantially different program guide data requirements, a first feed generator may be used to supply program guide data to one country and a second feed generator may be used to supply program guide data to another country. The queue generator divides the program guide data appropriately between the first and second feed generators, so that each feed generator need only process the program guide data for its list of addresses.

The feed generators generally select the program guide data with the highest priority for transmission to the receivers. Prior to transmission, the feed generators assemble compressed data records into messages. Each message contains multiple data records destined to the same receiver address. After transmitting a message, each feed generator performs calculations to determine how long the receivers to which it has transmitted the message will take to process the data in that message. These calculations are based on knowledge of the data processing capabilities of the receivers. For example, calculations may be made of how long it takes each receiver to process a certain type of program guide data record. Other factors that influence the feed generator calculations include the number and type of data buffers in each receiver and the processing speeds of the receivers. The results of the feed generator's calculations may be used to update a log or to maintain a similar type of record that indicates which receivers are currently busy. The feed generator regulates the flow of data to the receivers to avoid sending data to the busy receivers.

Because the feed generators handle the data flow regulation tasks associated with distributing data from the queue generator to the receivers, the local systems do not need to process the program guide data, which lessens the equipment requirements of the local systems.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
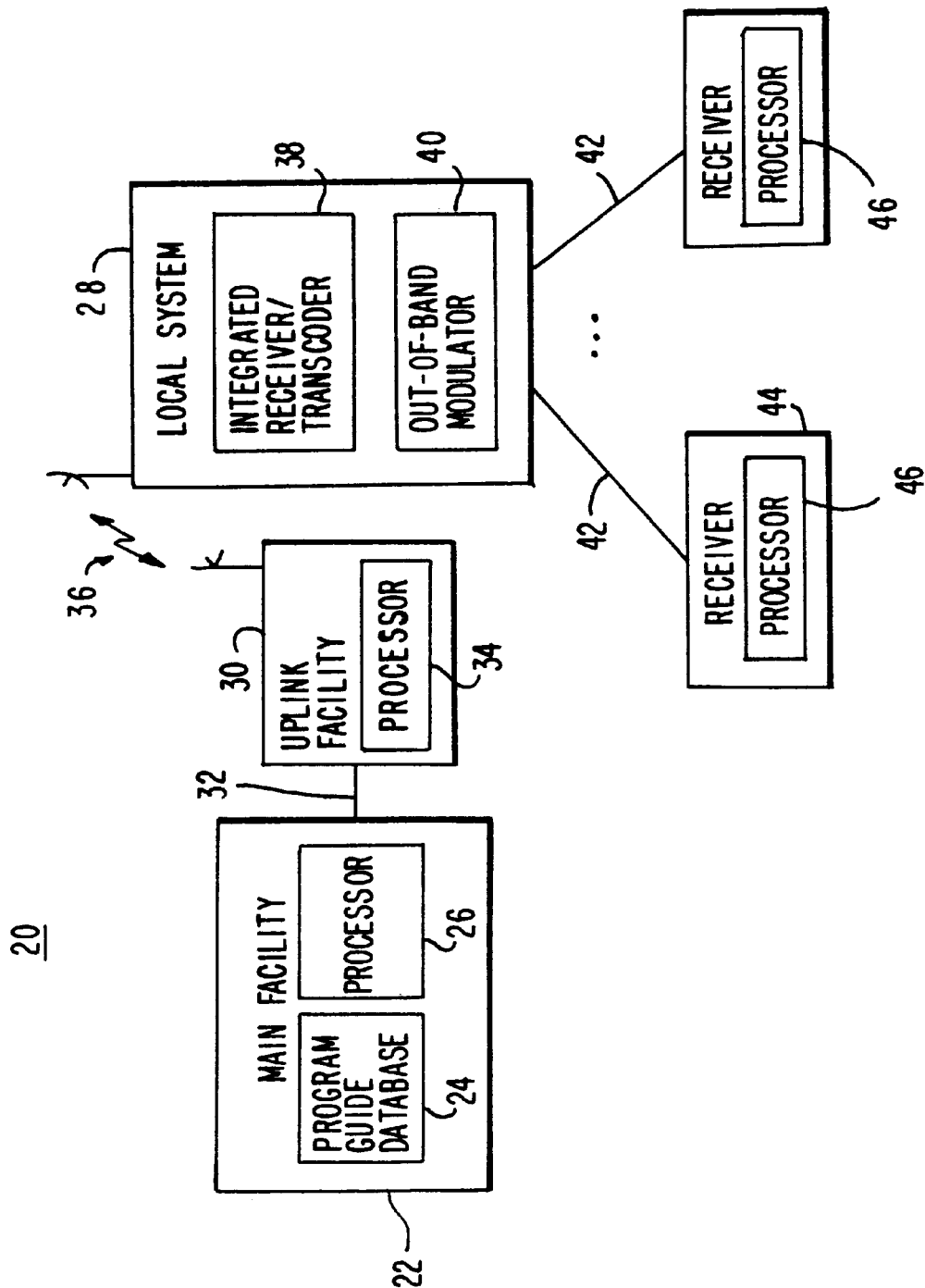
FIG. 1 is a schematic diagram of a television program guide data distribution system in accordance with the present invention.

An illustrative program guide data distribution system 20 in accordance with the present invention is shown in FIG. 1. Main facility 22 contains a program guide database 24 for storing program guide data such as television program guide listings data, pay-per-view ordering information, television program promotional information, etc. Main facility 22 also contains at least one processor 26, which is used to handle various data processing functions. Processed program guide data from main facility 22 may be transmitted directly to local system 28 via a satellite link or other suitable transmission path. Alternatively, main facility 22 may transmit program guide data to an intermediate distribution facility such as uplink facility 30 via communications link 32. Communications link 32 may be a T1 telephone line or any other suitable communications link. Uplink facility 30 may contain processor 34 for processing program guide data.

Uplink facility 30 transmits program guide data to local system 28 via communications link 36. If desired, more than one uplink facility 30 may be used in the data distribution system. For clarity, the invention is described in connection with a single uplink facility 30. Uplink facility 30 typically distributes program guide data to numerous local systems over a national or international geographic area. Only a single local system 28 is shown in FIG. 1 to avoid overcomplicating the drawings.

Link 36 may be a satellite link, a telephone network link, a cable or fiber optic link, a microwave link, a combination of such links, or any other suitable communications path. If it is desired to transmit video signals (e.g., for promotional videos) over link 36 in addition to data signals, a relatively high bandwidth link such as a satellite link may generally be preferred to a relatively low bandwidth link such as a telephone line. Information from local system 28 may be provided to main facility 22 via a suitable communications link if desired.

Local system 28 is a television distribution facility such as a cable system headend, a broadcast distribution facility, or a satellite television distribution facility. Local system 28 is operated by a television service provider such as a cable system operator, a satellite television system operator, or a broadcast television system operator.

The program guide data transmitted by main facility 22 to local system 28 includes television program listings data such as program times, channels, titles, descriptions, etc. Transmitted program guide data also includes pay program data such as pricing information for individual programs, subscription channels, and packages, time windows for ordering programs, channels and packages, telephone numbers for placing orders that cannot be impulse ordered, etc. If desired, some of this data may be provided using data sources at facilities other than main facility 22. For example, data related to pay program order processing (e.g., billing data and the like) may be generated by an order processing and billing system that is separate from main facility 22 and separate from local system 28.

Local system 28 typically contains an integrated receiver/transcoder 38 and an out-of-band modulator 40. Local system 28 receives program guide data from uplink facility 30 with integrated receiver/transcoder 38. Local system 28 distributes the program guide data to multiple users via communications paths 42 using out-of-band modulator 40. Each user has a receiver 44, which is typically a set-top-box, but which may be other suitable television equipment into which circuitry similar to set-top-box circuitry has been integrated. Program guide data is distributed to receivers 44 periodically. Local system 28 may also poll receivers 44 periodically for certain information (e.g., pay program account information or information regarding programs that have been purchased and viewed using locally-generated authorization techniques). Local system 28 generally does not need to use a processor to handle data distribution tasks, because data flow regulation tasks are handled by upstream processors 26 and 34.

Receivers 44 preferably contain processors 46. Processors 46 process the program guide data received from local system 28 and manage a localized receiver-based program guide database. Processors 46 are also used to implement an interactive television program guide on each receiver 44. Each receiver 44 is typically connected to an optional videocassette recorder, which in turn is connected to a television. During use of the interactive television program guide, television program listings may be displayed on the television. Each receiver 44 may be controlled by a remote control or other user input interface such as a wireless keyboard, mouse, trackball, etc.

Communications paths 42 preferably have sufficient bandwidth to allow local system 28 to distribute scheduled television programming, pay programming, promotional videos, and other video information to receivers 44 in addition to program guide data. Multiple television and audio channels (analog, digital, or both analog and digital) may be provided to receivers 44 via communications paths 42. If desired, program guide data may be distributed by one or more distribution facilities that are similar to but separate from local system 28 using communications paths that are separate from communications paths 42.

Certain functions such as pay program purchasing may require receivers 44 to transmit data to local system 28 over communications paths 42. If desired, such data may be transmitted over telephone lines or other separate communications paths. If functions such as these are provided using facilities separate from local system 28, some of the communications involving receivers 44 may be made directly with the separate facilities.

Figure 2:
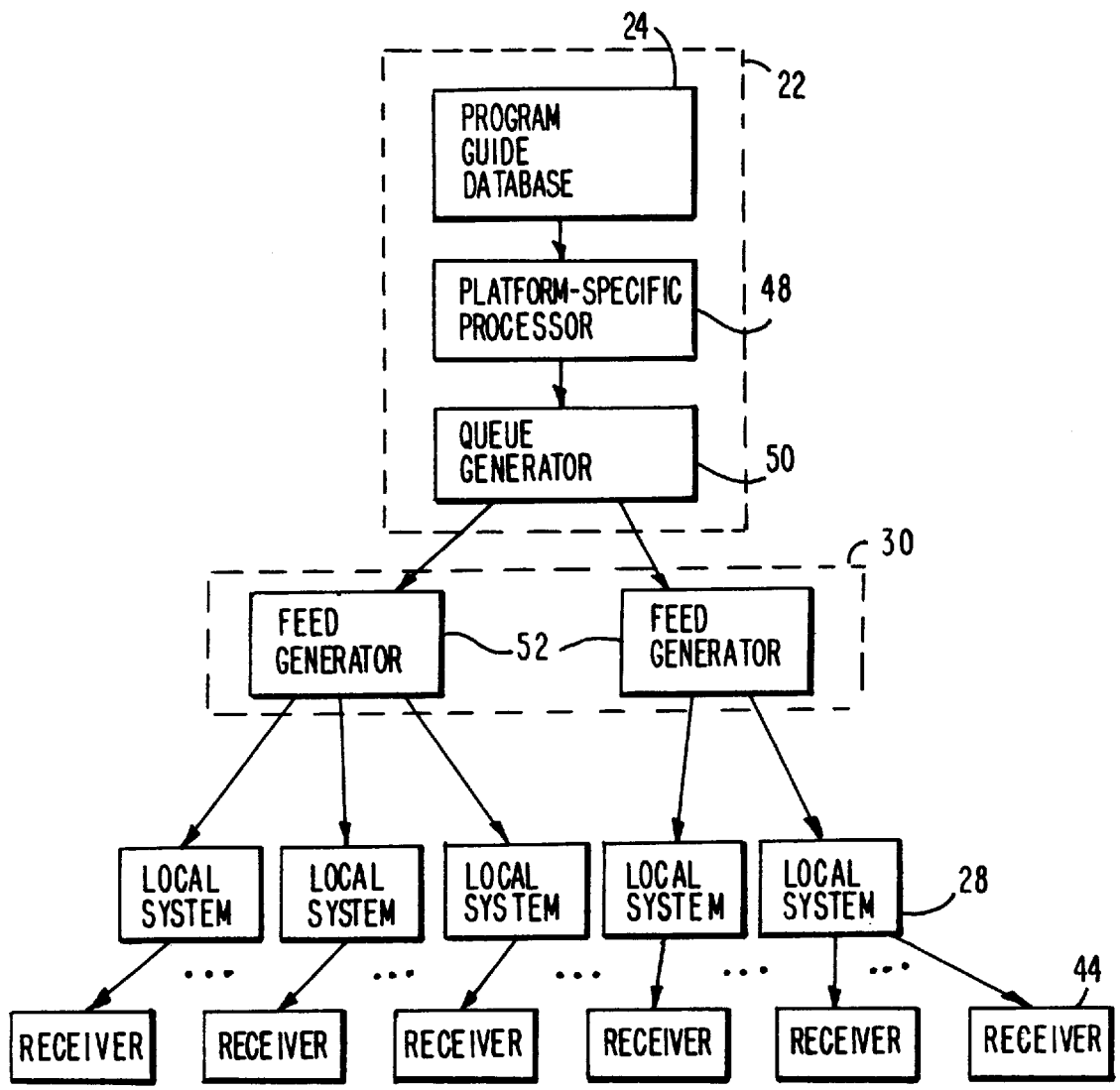
FIG. 2 is a schematic diagram showing various database and processor components of the program guide data distribution system in accordance with the present invention.

The program guide data distribution functions of main facility 22 are provided using program guide database 24, platform-specific processor 48, and queue generator 50, as shown in FIG. 2. Platform-specific processor 48 and queue generator 50 may be implemented using processor 26 (FIG. 1). The program guide data distribution functions of uplink facility 30 are provided with multiple feed generators 52, which may be implemented using processor 34 (FIG. 1). The program guide data distribution functions of local systems 28 are essentially limited to redistributing the program guide data received from uplink facility 30 to receivers 44. Program guide data processing in receivers 44 is performed using processors 46 (FIG. 1). The program guide data distributed to receivers 44 is used in the electronic television program guides implemented on receivers 44.

Figure 3:
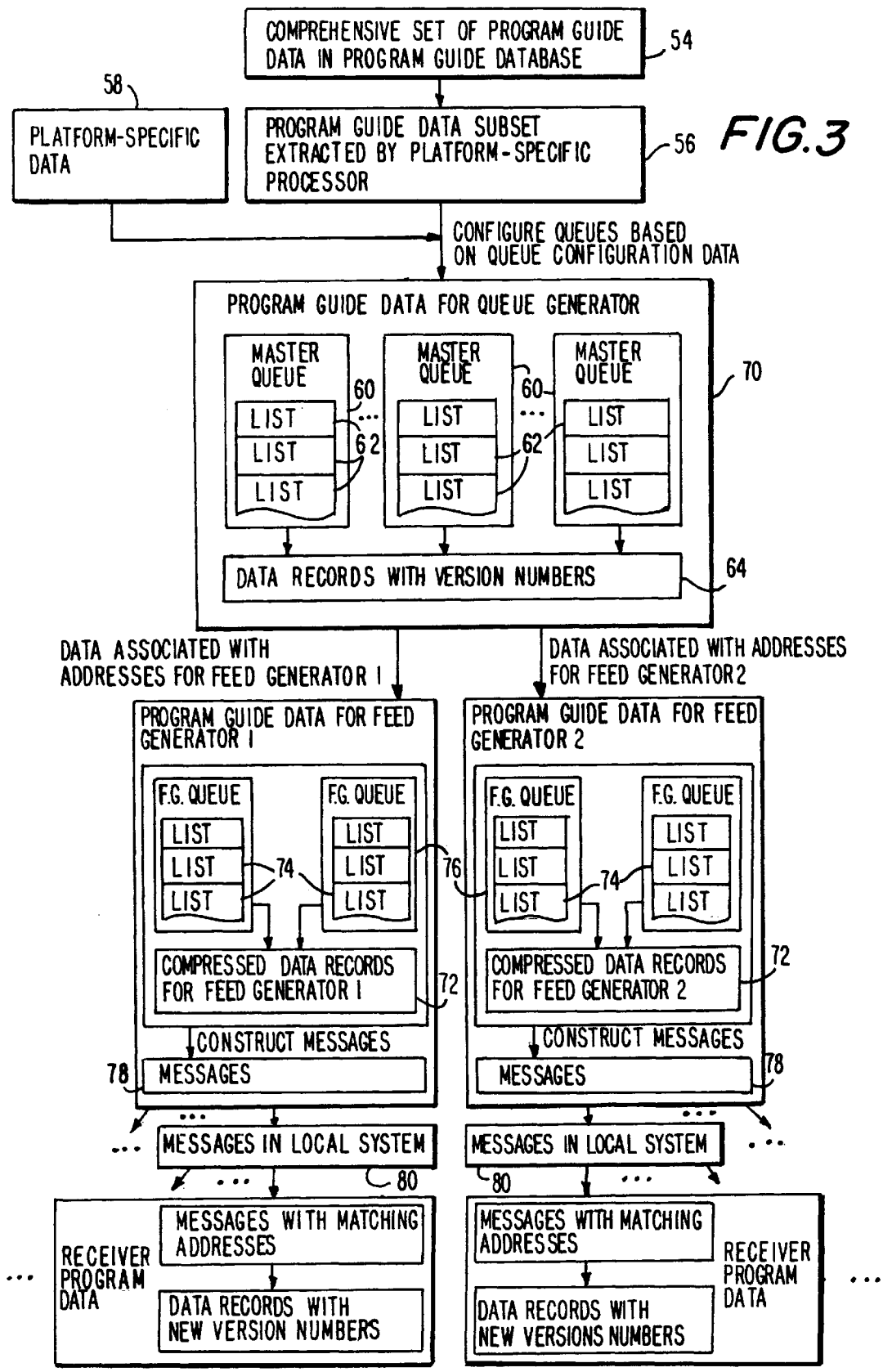
FIG. 3 is a schematic diagram showing program guide data structures that are used at various locations in the program guide data distribution system in accordance with the present invention.

FIG. 3 shows illustrative data structures and processing steps that may be used for distributing program guide data from program guide database 24 to receivers 44. Main facility 22 maintains a comprehensive set 54 of program guide data in program guide database 24 (FIG. 1). Periodically (e.g., once per day), platform-specific processor 48 extracts program guide data from comprehensive set 54 to form a subset 56 of program guide data. Subset 56 includes program guide data for all receivers to which data is to be distributed. Subset 56 preferably contains sufficient data to cover the time range required by receivers 44 (e.g., a weeks worth of data to cover listings for television programs coming up in the next week). In addition, subset 56 preferably contains sufficient data to provide a supplemental buffer of several days in length (e.g., four days). The supplemental buffer allows program guide data to be distributed without interruption over long weekends, holidays, and short episodes of down-time at main facility 22 (during which no new extracts of data are made).

Platform-specific processor 48 assigns different groups of receivers 44 different addresses. A common address may be assigned to receivers 44 associated with a particular local system 28, receivers 44 in a single geographical region, receivers 44 in multiple geographic areas, receivers 44 associated with a single service provider, receivers 44 associated with a single program guide product, or any other suitable set of receivers 44.

Platform-specific processor 48 may also add platform-specific data (i.e., data that is destined to a particular platform such as all set-top boxes of a certain type) to subset 56. Such platform-specific data may include, for example, pricing and ordering information for pay programming, information about each local system 28 such as telephone numbers, logos, display format information, information on the number of channels supported, subscriber messages, program guide configuration information, and other supplementary information used by the program guides on receivers 44. Each item of platform-specific data may be provided with an address.

Queue generator 50 extracts portions of program guide data from platform-specific processor 48 (preferably at the same regular intervals used by platform-specific processor 48 when extracting data from comprehensive set 54 to form subset 56). Queue generator 50 inserts the extracted portions of program guide data into master queues 60 based on queue configuration data. Any suitable number of master queues 60 may be formed in queue generator 50. Master queues 60 are preferably made up of a number of ordered lists 62, each of which contains entries associated with respective program guide data records 64. Data records 64 contain the program guide data provided to queue generator 50 from platform-specific processor 48.

The queue configuration data used to configure master queues 60 may include information specifying what type of data records should be placed in each queue. The queue configuration data may also include information specifying the duration covered by the list (i.e., the time range each list 62 should cover—from 12:30 AM to 1:00 AM, etc.). Queue configuration data may be used to specify how often data for master queues 60 should be transmitted to local systems 28 for distribution to receivers 44 (i.e., the transmission frequency for each master queue 60, which depends on how critical the data in each master queue 60 is to a given local system 28). Queue configuration data may also be used to specify how often the data for the master queue 60 should be updated. Other queue attributes that may be configured include the start time of each list 62 and the expiration time of each list 62 (i.e., the time at which the data in the list is supplanted by data in another list). The data in each list 62 typically expires at the start time of the next list 62 in master queue 60. Queue configuration data may be used to define how often data for the queue should be transmitted after all data has expired (i.e., when the supplemental buffer is empty). When the supplemental buffer is empty, the data for some queues should no longer be transmitted and the data for other queues should be transmitted more frequently. These configurable queue attributes are illustrative only. Queue configuration data may be used to specify other suitable queue attributes if desired.

Queue configuration data may be supplied to queue generator 50 by the operator of main facility 22 whenever it is desired to reconfigure the system. An operator may supply the queue generator with queue configuration data using any suitable technique, such as entering the data with a mouse, trackball, or keyboard, or supplying the data on a diskette, etc. By supplying new queue configuration data, the operator can readily adjust the number and type of queues that are being used to process the extracted portions of program guide data. This allows the operator to optimize the data handling capabilities of the system to accommodate the addition of new cable systems, even though the bandwidth of the data distribution system remains fixed.

Illustrative master queues 60 include a service information queue (e.g., the left queue 60 in FIG. 3), a current listings queue (e.g., the center queue 60 in FIG. 3), and a seven-day listings queue (e.g., the right queue 60 in FIG. 3). The service information queue may be used for service information such as call letters. Data records 64 may be of the service record type. Because such service records are not particularly time-sensitive, the service information queue may cover the entire duration of the extracted portion of the program guide (e.g., eleven days—a seven-day extracted portion of data plus a four-day supplemental buffer). The service data may be transmitted frequently (e.g., every five minutes), because such data is relatively important for the proper operation of the interactive television program guides on receivers 44. The data in the service information queue need not be updated, because it will not change during the period of time over which queue generator 50 extracts the portion of program guide data from platform-specific processor 48. The data should be transmitted from a time beginning at the time at which the portion of data extracted from the platform-specific processor becomes valid and continuing until the time at which the extracted portion expires.

The current listings queue may be used for schedule information, program listings, and program descriptions. For example, the current listings queue may include data for all programs that air between the start time of the list and one half-hour later. Program guide data for the current listings queue may be transmitted every five minutes and may be updated every 15 minutes. Each set of data may therefore be transmitted three times. Each data set expires 15 minutes after it begins. Expired data sets are not transmitted.

The seven-day listings queue may also be used for schedule information, program listings, and program descriptions. The seven-day listings queue may include data for all programs airing in the next week. The data for the seven-day queue may be transmitted every four hours and may be updated every eight hours. A set of data for the seven-day listings queue expires after eight hours. Expired data may be sent once every hour.

Queue generator 50 determines when the program guide data for data records 62 changes (either in program guide database 24 or in platform-specific processor 48) and appends corresponding version numbers to each data record 64. Receivers 44 only store new data records 64 or data records 64 that have more current version numbers than previously stored data records 64. If desired, queue generator 50 can change the version number on all data records 64 to force receivers 44 to acquire all data records 64.

Figure 4:
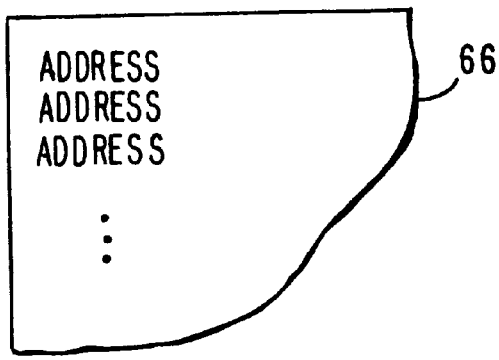
FIG. 4 is a schematic diagram of two illustrative sets of addresses each of which is associated with a respective feed generator in accordance with the present invention.
Figure 4:
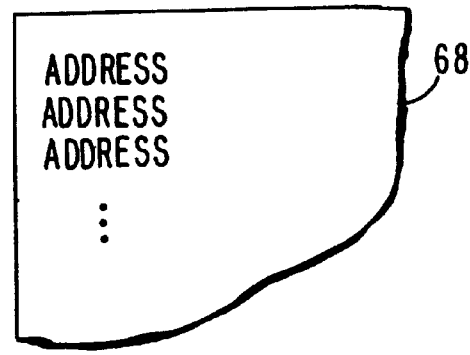

Program guide data from queue generator 50 is preferably distributed to receivers 44 using a number of feed generators 52, each of which is associated with a particular set of addresses. As shown in FIG. 4, feed generator No. 1 is associated with list of addresses 66 and feed generator No. 2 is associated with list of addresses 68. Although each feed generator 52 generally handles the data for a different set of addresses, the addresses in lists 66 and 68 need not be mutually exclusive. More than one feed generator 52 may process program guide data for the same address if desired. Any suitable number of feed generators 52 may be used. For example, three feed generators might be used—one to service Canada, one to service the eastern United States, and one to service the western United States. For clarity, the description of the present invention emphasizes the use of two feed generators (Nos. 1 and 2).

As shown in FIG. 3, after master queues 60 have been built and the version numbers associated with data records 64 have been updated, queue generator 50 (FIG. 2) provides the program guide data 70 that is associated with list of addresses 66 to feed generator No. 1 and provides the program guide data 70 that is associated with list of addresses 68 to feed generator No. 2. This arrangement improves system performance, because it avoids duplication of effort by feed generators 52. Program guide data that is to be distributed only to the addresses associated with feed generator No. 1 does not need to be passed through feed generator No. 2. Similarly, program guide data that is to be distributed only to the addresses associated with feed generator No. 2 does not need to be passed through feed generator No. 1. Each feed generator 52 therefore needs to bring its full processing power to bear on as little program guide data as possible.

If desired, a queue generator may be used that creates multiple sets of master queues, each associated with one or more respective feed generators. Alternatively, a queue generator may be used that uses one set of master queues and that passes this same set of master queues to multiple feed generators in its entirety along with a list of addresses for each feed generator. Each feed generator then transmits only the portion of the master queue data that is associated with the addresses in its list.

Queue generator 50 compresses the program guide data in data records 64 into compressed data records 72 for use with the feed generators. Compression reduces the bandwidth required by feed generators 52 and lessens the memory requirements of receivers 44. Queue generator 50 also processes the information in master queue lists 62 to form feed-generator-specific lists 74 in feed generator queues 76. Each feed generator list 74 contains references to associated compressed data records 72.

Feed generators 52 construct data messages 78 for receivers 44 from the feed generator queues 76 and the associated compressed data records 72. The active lists 74 (i.e., the lists 74 that are being transmitted by each feed generator 52) are prioritized by factors such as expiration time, the number of messages remaining to be transmitted, the next scheduled message transmission time, the state of the list (e.g., whether all of the data for the list has expired), and an arbitrary priority assigned to each feed generator queue 76. The priority of the various lists 74 shifts over time, as certain queues become filled up and other queues empty. Each feed generator 52 constructs messages starting with data in the highest priority queue and continuing with data in the same or other queues that share the same address. Messages 78 are transmitted to local systems 28, where they are shown as messages 80 in FIG. 3.

Figure 5:
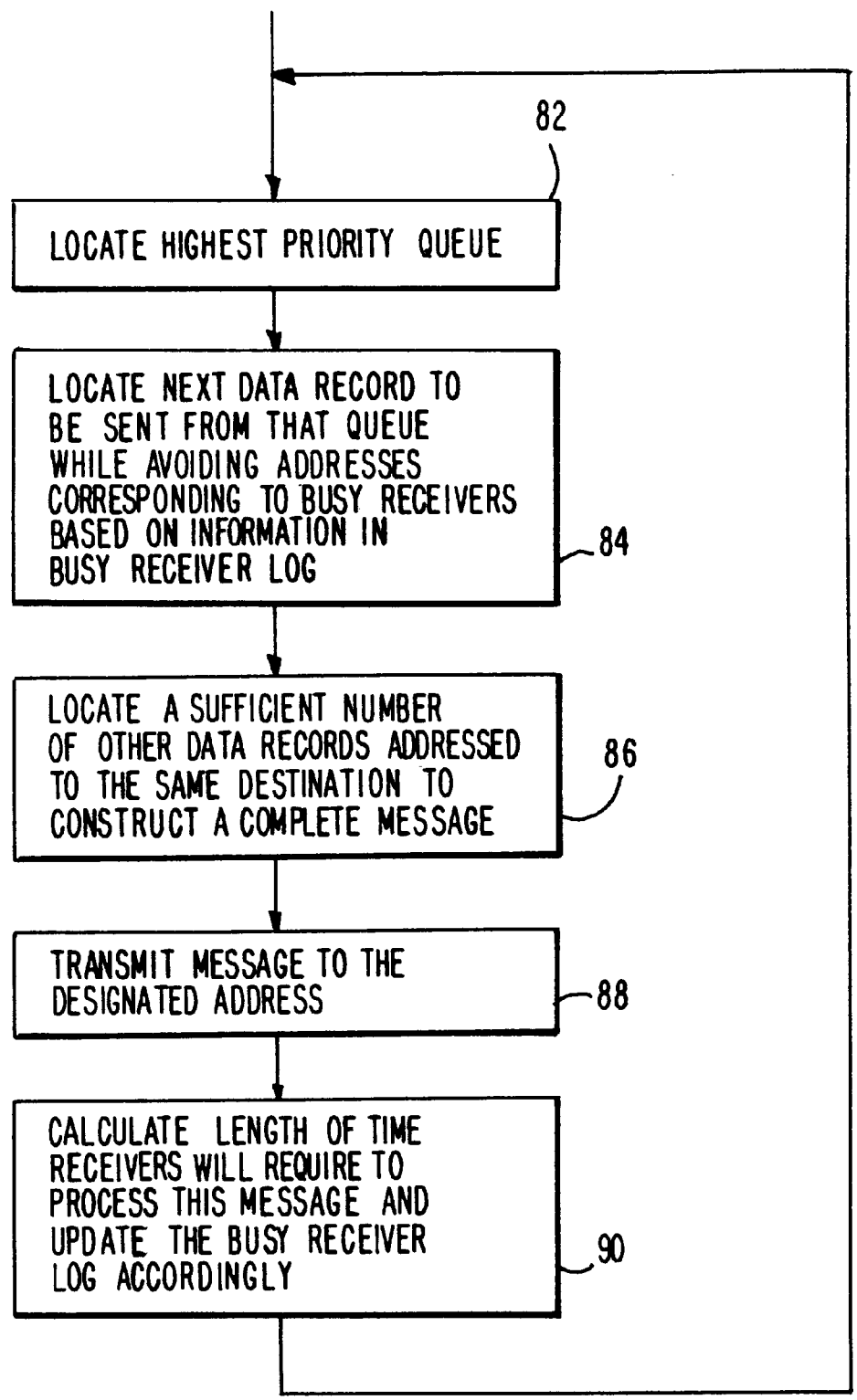
FIG. 5 is a flow chart of steps involved in distributing data to receivers using feed generators in accordance with the present invention.

Steps involved in constructing messages 78 and distributing messages 78 to local systems 28 with each feed generator 52 are shown in FIG. 5. At step 82, feed generator 52 locates the highest priority feed generator queue 76. At step 84, feed generator 52 locates the next data record 72 to be transmitted for that queue 76 while avoiding data records 72 with addresses corresponding to busy receivers. Information on which receivers are busy may be maintained in a busy receiver log or a similar type of data structure. At step 86, feed generator 52 locates a sufficient number of other data records addressed to the same destination to construct a complete message 78. The data records located by feed generator 52 are initially taken from the highest priority queue and are then taken from other queues in order of descending priority. At step 88, feed generator 52 transmits the complete message to its designated address. At step 90, feed generator 52 calculates the length of time the receivers 44 to which the complete message was transmitted will require to process the message and updates the busy receiver log accordingly. Feed generator 52 then returns to step 82.

The calculation at step 90 of the length of time receivers 44 will take to process the message requires that feed generator 52 be provided with information on the processing speed of the particular types of receiver 44 that are involved. Feed generators 52 are also provided with information regarding the number of buffers in receivers 44 and their characteristics. In addition, the calculation requires that feed generator 52 be provided with information on the processing times associated with various tasks. For example, it may take 150 ms to process a program schedule record (e.g., a record containing a program listing for channel 4 at 9:00, etc.). It may take 110 ms to process a program text description. It might take 80 ms to process a logo, etc. Based on this type of information, feed generator 52 determines the total amount of time certain receivers 44 will be busy following transmission of a message 78. The results of the calculation are used to update the busy receiver log, so that the next message that is transmitted will not be sent to a busy receiver. Each feed generator 52 is preferably provided with sufficient information (e.g., from the operator of main facility 22) to make the processing time calculations of step 90 for the receivers 44 associated with the local systems 28 serviced by that feed generator 52.

The messages 78 that are transmitted by feed generator 52 are received by local systems 28 and retransmitted to receivers 44. Local systems 28 do not need to process the messages, which minimizes the expense of the equipment required in local systems 28.

Each message has an associated address. When a receiver 44 receives a message, the received address is compared to a set of predefined local addresses for that receiver. Messages whose addresses do not match any of the predefined local addresses are discarded by the receiver, so that the receiver does not waste time processing a message not intended for that receiver.

Messages with matching addresses are divided by the receiver into individual data records, each of which is processed separately. Each data record is processed to determine whether a corresponding data record is already stored in the receiver's memory. If a data record is located in memory and its version number is the same as the data record that was just received, the data record that was just received is discarded. If the data record that was just received has a different (i.e., newer) version number, the data record in memory is discarded and the data record that was just received is stored. If there is no match between a newly received data record and a data record already in memory, the newly received data record is stored. Because receivers 44 filter out all but properly addressed messages that contain new data, receivers 44 do not expend unnecessary time processing data records.

The foregoing is merely illustrative of the principles of this invention and various modifications can be made by those skilled in the art without departing from the scope and spirit of the invention.

What is claimed is:

1. A method for distributing program guide data from a main facility through local systems to a plurality of receivers, comprising:

forming a plurality of queues in a location separate from the local systems for the program guide data;

selectively changing the configuration of the queues; and distributing the program guide data from the queues to the receivers using the local systems.

2. The method defined in claim 1 wherein the selectively changing the configuration of the queues further comprises selectively changing the configuration of the queues based on the type of data records associated with the queues.

3. The method defined in claim 1 wherein the queues contain lists of data records, the selectively changing the configuration of the queues further comprising selectively changing the configuration of the queues based on the duration covered by the lists that are contained within the queues.

4. The method defined in claim 1 wherein the selectively changing the configuration of the queues further comprises selectively changing the configuration of the queues based on how frequently the program guide data for the queues is distributed to the receivers.

5. The method defined in claim 1 wherein the selectively changing the configuration of the queues further comprises selectively changing the configuration of the queues based on how frequently the program guide data for the queues is updated.

6. The method defined in claim 1 wherein the queues contain lists of data records, the selectively changing the configuration of the queues further comprising selectively changing the configuration of the queues based on when the lists start.

7. The method defined in claim 1 wherein the queues contain lists of data records, the selectively changing the configuration of the queues further comprising selectively changing the configuration of the queues based on when the lists expire.

8. The method defined in claim 1 wherein the selectively changing the configuration of the queues further comprises selectively changing the configuration of the queues based on how frequently the program guide data for the queues is transmitted after the program guide data has expired.

9. The method defined in claim 1 wherein the selectively changing the configuration of the queues further comprises selectively changing the configuration of the queues based on queue configuration data provided at the main facility.

10. The method defined in claim 1 wherein the forming of the plurality of queues further comprises forming a service information queue.

11. The method defined in claim 1 wherein the forming of the plurality of queues further comprises forming a current listings queue.

12. The method defined in claim 1 wherein the forming of the plurality of queues further comprises forming a seven-day listings queue.

13. The method defined in claim 1 wherein the program guide data for each queue is contained in data records, the forming of the plurality of queues further comprising adding version numbers to the data records.

14. A system for distributing program guide data from a main facility through local systems to a plurality of receivers, comprising:

means located separate from the local systems for forming a plurality of queues for the program guide data;

means for selectively changing the configuration of the queues; and means for distributing the program guide data from the queues to the receivers using the local systems.

15. The system defined in claim 14 wherein the means for selectively changing the configuration of the queues further comprises means for selectively changing the configuration of the queues based on the type of data records associated with the queues.

16. The system defined in claim 14 wherein the queues contain lists of data records, the means for selectively changing the configuration of the queues further comprising means for selectively changing the configuration of the queues based on the duration covered by the lists that are contained within the queues.

17. The system defined in claim 14 wherein the means for selectively changing the configuration of the queues further comprises means for selectively changing the configuration of the queues based on how frequently the program guide data for the queues is distributed to the receivers.

18. The system defined in claim 14 wherein the means for selectively changing the configuration of the queues further comprises means for selectively changing the configuration of the queues based on how frequently the program guide data for the queues is updated.

19. The system defined in claim 14 wherein the queues contain lists of data records, the means for selectively changing the configuration of the queues further comprising means for selectively changing the configuration of the queues based on when the lists start.

20. The system defined in claim 14 wherein the queues contain lists of data records, the means for selectively changing the configuration of the queues further comprising means for selectively changing the configuration of the queues based on when the lists expire.

21. The system defined in claim 14 wherein the means for selectively changing the configuration of the queues further comprises means for selectively changing the configuration of the queues based on how frequently the program guide data for the queues is transmitted after the program guide data has expired.

22. The system defined in claim 14 wherein the means for selectively changing the configuration of the queues further comprises means for selectively changing the configuration of the queues based on queue configuration data provided at the main facility.

23. The system defined in claim 14 wherein the means for forming the queues further comprises means for forming a service information queue.

24. The system defined in claim 14 wherein the means for forming the queues further comprises means for forming a current listings queue.

25. The system defined in claim 14 wherein the means for forming the queues further comprises means for forming a seven-day listings queue.

26. The system defined in claim 14 wherein the program guide data for each queue is contained in data records, the means for forming the queues further comprising means for adding version numbers to the data records.

27. A system for distributing program guide data from a main facility through local systems to a plurality of receivers, comprising:
    a queue generator in a location separate from the local systems that forms a plurality of queues for the program guide data, wherein:
        the configuration of the queues is selectively changeable; and
        the program guide data is distributed from the queues to the receivers using the local systems.

28. The system defined in claim 27 wherein the configuration of the queues is selectively changeable based on the type of data records associated with the queues.

29. The system defined in claim 27 wherein the queues contain lists of data records and the configuration of the queues is selectively changeable based on the duration covered by the lists that are contained within the queues.

30. The system defined in claim 27 wherein the configuration of the queues is selectively changeable based on how frequently the program guide data for the queues is distributed to the receivers.

31. The system defined in claim 27 wherein the configuration of the queues is selectively changeable based on how frequently the program guide data for the queues is updated.

32. The system defined in claim 27 wherein the queues contain lists of data records and the configuration of the queues is selectively changeable based on when the lists start.

33. The system defined in claim 27 wherein the queues contain lists of data records and the configuration of the queues is selectively changeable based on when the lists expire.

34. The system defined in claim 27 wherein the configuration of the queues is selectively changeable based on how frequently the program guide data for the queues is transmitted after the program guide data has expired.

35. The system defined in claim 27 wherein the configuration of the queues is selectively changeable based on queue configuration data provided at the main facility.

36. The system defined in claim 27 wherein at least one of the queues is a service information queue.

37. The system defined in claim 27 wherein at least one of the queues is a current listings queue.

38. The system defined in claim 27 wherein at least one of the queues is a seven-day listings queue.

39. The system defined in claim 27 wherein the program guide data for each queue is contained in data records and the queue generator adds version numbers to the data records.

40. A system for distributing program guide data from a main facility through local systems to a plurality of receivers without processing the program guide data substantially in the local systems, comprising:
    means for forming a plurality of feed generator queues for program guide data records;
    means for locating a high priority feed generator queue;
    means for locating a given data record to be transmitted from the high priority feed generator queue while avoiding data records with addresses corresponding to receivers that are busy;
    means for constructing a message from other data records with the same address as the given data record;
    means for transmitting the message to receivers having the address of the given data record; and
    means for determining how long those receivers will be busy processing the transmitted message using information about the contents of the transmitted message.

41. A method for distributing program guide data from a main facility through local systems to a plurality of receivers without processing the program guide data substantially in the local systems, comprising:
    forming a plurality of feed generator queues for program guide data records;
    locating a high priority feed generator queue;
    locating a given data record to be transmitted from the high priority feed generator queue while avoiding data records with addresses corresponding to receivers that are busy;
    constructing a message from other data records with the same address as the given data record;
    transmitting the message to receivers having the address of the given data record; and
    determining how long those receivers will be busy processing the transmitted message using information about the contents of the transmitted message.

42. A system for distributing program guide data from a main facility through local systems to a plurality of receivers without processing the program guide data substantially in the local systems, comprising:
    a feed generator for forming a plurality of feed generator queues for program guide data records, wherein the feed generator:
    locates a high priority feed generator queue;
    locates a given data record to be transmitted from the high priority feed generator queue while avoiding data records with addresses corresponding to receivers that are busy;
    constructs a message from other data records with the same address as the given data record;
    transmits the message to receivers having the address of the given data record; and
    determines how long those receivers will be busy processing the transmitted message using information about the contents of the transmitted message.

* * * * *

UNITED STATES PATENT AND TRADEMARK OFFICE
CERTIFICATE OF CORRECTION

PATENT NO.   : 6.137,549
DATED        : October 24, 2000
INVENTOR(S)  : Donald Rasson et al.

It is certified that error appears in the above-identified patent and that said Letters Patent is hereby corrected as shown below:

Column 4,
Line 10, change "channels, and" to -- channels and --.
Line 25, change "set-top-box" to -- set-top box --.
Line 27, change "set-top-box" to -- set-top box --.

Signed and Sealed this

Twenty-seventh Day of August, 2002

Attest:

JAMES E. ROGAN
Attesting Officer    Director of the United States Patent and Trademark Office